(12) United States Patent
Giesler et al.

(10) Patent No.: US 8,844,968 B2
(45) Date of Patent: Sep. 30, 2014

(54) MOTOR VEHICLE WITH OCCUPANT PROTECTION DEVICE

(71) Applicant: Audi AG, Ingolstadt (DE)

(72) Inventors: Björn Giesler, Ingolstadt (DE);
Thorsten Kölzow, Ingolstadt (DE);
Bernd Jakobs, Nürnberg (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 14/026,618

(22) Filed: Sep. 13, 2013

(65) Prior Publication Data

US 2014/0077482 A1 Mar. 20, 2014

(30) Foreign Application Priority Data

Sep. 14, 2012 (DE) .......................... 10 2012 018 214

(51) Int. Cl.
*B60R 21/0134* (2006.01)
*B60R 21/013* (2006.01)
*B60R 21/00* (2006.01)

(52) U.S. Cl.
CPC ........... *B60R 21/013* (2013.01); *B60R 21/0134* (2013.01); *B60R 2021/0006* (2013.01); *B60R 2021/01345* (2013.01)
USPC ............................ 280/735; 280/730.2; 701/45

(58) Field of Classification Search
CPC .... B60R 21/207; B60R 21/21; B60R 21/213; B60R 21/23138; B60R 21/013; B60R 21/0132; B60R 21/0134; B60R 21/0136; B60R 2021/01013; B60R 2021/013; B60R 2021/0132; B60R 2021/0134; B60R 2021/01345; B60R 2021/207; B60R 2021/23138; B60R 2021/23146; B60Q 1/525; B60Q 9/008; G01M 17/0078
USPC ....................... 280/730.2, 734, 735; 180/274; 701/45–47; 307/120, 123; 340/436; 73/12.01, 12.09

See application file for complete search history.

(56) References Cited

U.S. PATENT DOCUMENTS

| | | | | |
|---|---|---|---|---|
| 3,654,412 | A * | 4/1972 | Haruna et al. | 200/83 Z |
| 4,209,185 | A * | 6/1980 | St. Clair et al. | 280/734 |
| 5,428,534 | A * | 6/1995 | Wetzel et al. | 701/46 |
| 5,547,216 | A * | 8/1996 | Iwata et al. | 280/734 |
| 5,670,718 | A * | 9/1997 | Nagahara | 73/514.11 |
| 5,748,075 | A | 5/1998 | Dirmeyer et al. | |
| 5,884,203 | A * | 3/1999 | Ross | 701/45 |
| 5,974,892 | A * | 11/1999 | Swart et al. | 73/714 |
| 6,732,566 | B2 * | 5/2004 | Roelleke et al. | 73/12.08 |
| 6,885,966 | B1 * | 4/2005 | Tyroller et al. | 702/138 |
| 7,156,416 | B2 * | 1/2007 | Rajasingham | 280/730.1 |

(Continued)

FOREIGN PATENT DOCUMENTS

| | | |
|---|---|---|
| DE | 198 30 835 C2 | 4/2000 |
| DE | 102 44 730 A1 | 4/2004 |

(Continued)

*Primary Examiner* — Faye M Fleming
*Assistant Examiner* — Laura Freedman
(74) *Attorney, Agent, or Firm* — Henry M. Feiereisen LLC

(57) ABSTRACT

A motor vehicle includes an occupant protection device which is provided for a side region of the motor vehicle. The occupant protection device includes a sensor capable of ascertaining an air pressure signal, and a control device capable of evaluating the air pressure signal and activating the occupant protection device when determining that the air pressure signal indicates the presence of a pressure wave generated before a collision.

11 Claims, 1 Drawing Sheet

(56) References Cited

U.S. PATENT DOCUMENTS

| | | | |
|---|---|---|---|
| 7,231,803 B2 * | 6/2007 | Stuetzler | 73/12.01 |
| 7,236,902 B2 * | 6/2007 | Otterbach et al. | 702/98 |
| 7,295,909 B2 * | 11/2007 | Recknagel | 701/45 |
| 7,331,238 B2 * | 2/2008 | Wanami et al. | 73/714 |
| 7,380,437 B2 * | 6/2008 | Wanami et al. | 73/12.09 |
| 7,380,458 B1 * | 6/2008 | Date et al. | 73/700 |
| 7,398,670 B2 * | 7/2008 | Takehara et al. | 73/12.09 |
| 7,422,086 B2 * | 9/2008 | Bujak | 180/274 |
| 7,438,152 B2 * | 10/2008 | Hawes et al. | 180/274 |
| 7,454,976 B2 * | 11/2008 | Wanami et al. | 73/730 |
| 7,525,416 B2 * | 4/2009 | Mader | 340/436 |
| 7,556,119 B2 * | 7/2009 | Takehara et al. | 180/274 |
| 7,568,393 B2 * | 8/2009 | Adam et al. | 73/715 |
| 7,708,102 B2 * | 5/2010 | Takehara et al. | 180/274 |
| 7,711,467 B2 * | 5/2010 | Nonaka et al. | 701/45 |
| 8,175,769 B2 * | 5/2012 | Perrin et al. | 701/469 |
| 8,181,730 B2 * | 5/2012 | Higuchi | 180/274 |
| 8,406,959 B2 * | 3/2013 | Foo et al. | 701/45 |
| 8,412,415 B2 * | 4/2013 | Metzler | 701/45 |
| 8,577,555 B2 * | 11/2013 | Kula et al. | 701/45 |
| 2006/0021815 A1 * | 2/2006 | Ohtaka | 180/274 |
| 2006/0237255 A1 * | 10/2006 | Wanami et al. | 180/274 |
| 2007/0035182 A1 | 2/2007 | Wellhoefer et al. | |
| 2007/0045027 A1 * | 3/2007 | Nonaka et al. | 180/274 |
| 2007/0084128 A1 * | 4/2007 | Recknagel et al. | 49/502 |
| 2008/0173107 A1 * | 7/2008 | Leach et al. | 73/865.3 |
| 2010/0179731 A1 * | 7/2010 | Le et al. | 701/47 |

FOREIGN PATENT DOCUMENTS

| | | | | |
|---|---|---|---|---|
| DE | 102 34 624 A1 | 5/2004 | | |
| DE | 103 31 964 A1 | 2/2005 | | |
| DE | 10 2006 051 295 A1 | 4/2008 | | |
| DE | 10 2006 018 901 B4 | 10/2008 | | |
| JP | 06055992 A | * | 3/1994 | B60R 21/32 |
| WO | WO 94/11223 | 5/1994 | | |
| WO | WO 9411223 A1 | * | 5/1994 | B60R 21/00 |

\* cited by examiner

MOTOR VEHICLE WITH OCCUPANT PROTECTION DEVICE

CROSS-REFERENCES TO RELATED APPLICATIONS

This application claims the priority of German Patent Application, Serial No. 10 2012 018 214.7, filed Sep. 14, 2012, pursuant to 35 U.S.C. 119(a)-(d), the content of which is incorporated herein by reference in its entirety as if fully set forth herein.

BACKGROUND OF THE INVENTION

The present invention relates to a motor vehicle with an occupant protection device.

The following discussion of related art is provided to assist the reader in understanding the advantages of the invention, and is not to be construed as an admission that this related art is prior art to this invention.

Motor vehicles are oftentimes equipped with occupant protection devices such as airbags arranged on one or both sides of the motor vehicle. A pressure-sensitive sensor ascertains a pressure differential which increases as a result of a collision with a penetrating object. A mechanical impact with an object, for example another vehicle, or a stationary object such as a tree, causes a deformation of a side region of the motor vehicle, accompanied by a change in pressure that can be ascertained by the sensor. As a consequence, the occupant protection device is triggered, for example by deploying a side airbag.

It would be desirable and advantageous to provide an improved motor vehicle to obviate prior art shortcomings and to enable earlier detection of an imminent collision and thereby allow earlier activation of an occupant protection device.

SUMMARY OF THE INVENTION

According to one aspect of the present invention, a motor vehicle includes an occupant protection device provided for a side region of the motor vehicle and including a sensor capable of ascertaining an air pressure signal, and a control device capable of evaluating the air pressure signal and activating the occupant protection device when determining that the air pressure signal indicates the presence of a pressure wave generated before a collision.

The present invention resolves prior art problems by recognizing early on the onset of a pressure rise before the pressure then rises intensely. The onset of a pressure rise can be used as criterion to trigger the occupant protection device and is caused by a pressure wave (bow wave) generated by another vehicle on a collision course, before the actual crash with resultant intense pressure rise occurs. This type of pressure wave is thus generated briefly before the actual impact takes place and can be detected by the sensor. A similar phenomenon can be observed in the event of an imminent impact against a fixed obstacle, e.g. a tree. When a certain, relatively slight distance is reached between the object or obstacle and the side region of the vehicle, air is compressed in the space between and can be detected as a pressure wave.

The air pressure signal ascertained by the sensor is analyzed by the control device. When the control device determines the presence of a pressure wave before the actual impact, the occupant protection device is activated. As a result, the occupant protection device can be deployed earlier than in conventional motor vehicles in which the deployment takes place only when an actual mechanical impact has occurred. Even though the time period between detection of the pressure wave and thus activation of the occupant protection device in accordance with the present invention and the actual impact is in a range of milliseconds, the benefit of an occupant protection device according to the present invention is still substantial and can make a difference in the protection of occupants.

According to another advantageous feature of the present invention, the control device for detecting the pressure wave can be configured to evaluate duration and/or magnitude and/or increase (rate of rise) of the air pressure signal. As a result, the control device is capable to differentiate on the basis of specific characteristics between a pressure wave generated before an imminent collision and pressure fluctuations encountered during normal travel as a result of, e.g., changes in speed or lateral wind impacts. A pressure wave encountered before a collision is characterized by specific quantifiable characteristics and can be ascertained and verified on the basis of the air pressure signal. Thus, the control device can compute whether a detected pressure rise involves a pressure wave which is generated before a collision and is distinguishable by its specific characteristics such as duration of the pressure rise, magnitude of the pressure rise, and rate of rise.

According to another advantageous feature of the present invention, the control device can be configured to trigger the occupant protection device before the collision. In this way, precious time can be gained to deploy an occupant protection device, e.g. airbag. Earlier deployment results in quicker deployment of e.g. an airbag and thus improves occupant protection.

According to another advantageous feature of the present invention, the occupant protection device can have two sensors arranged respectively on both sides of the motor vehicle. This further enhances protection of occupants. As an alternative or in addition, several sensors may be arranged on one side of the motor vehicle in spaced-apart relationship.

According to another advantageous feature of the present invention, the occupant protection device may include an airbag arranged in the interior space of the motor vehicle on the side region of the motor vehicle. Advantageously, the occupant protection device can include at least two airbags arranged in the interior space of the motor vehicle on opposite sides of the motor vehicle.

According to another advantageous feature of the present invention, the sensor for ascertaining the air pressure signal may be arranged in or behind a side sill or B-pillar of the motor vehicle. Advantageously, the sensor is hidden so as to be invisible from outside.

According to another advantageous feature of the present invention, the side sill or the B-pillar or a covering, behind which the sensor is arranged, can be configured to enable the sensor to detect a deformation caused by the pressure wave. The stiffness of the side sill, B-pillar, or covering, or the stiffness of a door or body sheet may hereby be dimensioned such that the presence of a pressure wave causes at least a minimal shift that can be detected by the sensor.

According to another aspect of the present invention, a method of triggering an occupant protection device of a motor vehicle includes ascertaining an air pressure signal by a sensor arranged in a side region of the motor vehicle, evaluating the air pressure signal by a control device, detecting a pressure wave caused before an impending collision, using the control device, on the basis of the air pressure signal; and activating the occupant protection device in response to a detection of the pressure wave.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
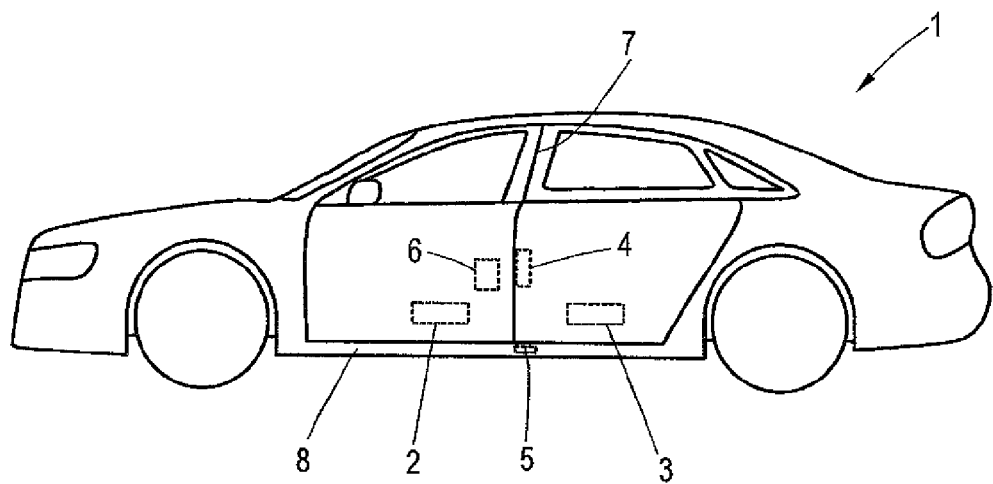
FIG. 1 is a side view of a motor vehicle equipped with an occupant protection device according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a side view of a motor vehicle, generally designated by reference numeral 1 and equipped with an occupant protection device according to the present invention. The occupant protection device includes airbags 2, 3 in the form of side airbags arranged on the driver side and rear seat bench, respectively. The occupant protection device further includes sensors 4, 5 for ascertaining an air pressure signal and a control device 6 operably connected to the sensors 4, 5. For ease of illustration, line connections between the control device 6 and the sensors 4, 5 and between the control device 6 and the airbags 2, 3 are not shown.

The sensor 4 is arranged in the area of the B-pillar 7 of the motor vehicle. The arrangement is hereby such that the sensor 4 is not visible from outside and is therefore hidden behind a covering of the B-pillar 7. The sensor 5 is arranged inside a side sill 8.

In the non-limiting example shown here, the sensors 4, 5 are provided in two different positions. It is, of course, also conceivable to use only a single sensor that is arranged on the driver side.

The sensors 4, 5 are configured to ascertain a pressure air signal. Thus, the sensors 4, 5 continuously produce an air pressure signal which is transmitted to the control device 6.

Figure 2:
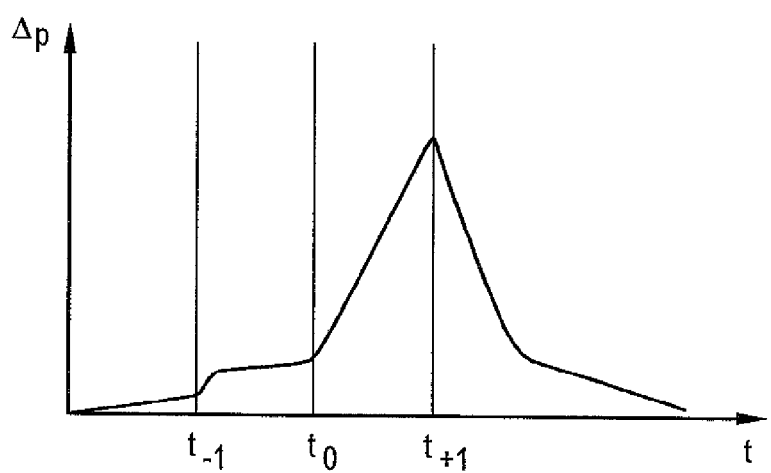
FIG. 2 is a graphical illustration of a time sequence of an air pressure signal in the event of a collision.

FIG. 2 shows a graphical illustration of a time sequence of an air pressure signal in the event of a collision and illustrates the chronological sequence of the air pressure signal as provided by a sensor before and during a collision. In the illustrated exemplary embodiment, the air pressure signal contains information with respect to a change of the air pressure in comparison to a reference value. In other embodiments, the air pressure signal may indicate also an absolute air pressure value.

As can be seen in FIG. 2, the pressure at time instance $t_1$ increases abruptly and a pressure rise can be observed between the time instance $t_1$ and $t_0$. This pressure rise can be explained by the presence of a pressure wave which is formed between the (own) motor vehicle and another party, i.e. another vehicle or fixed obstacle, involved in an accident. This pressure wave can be detected by the sensors 4, 5 before a mechanical contact of both accident participants occurs, i.e. before impact. The actual mechanical contact takes place at time instance $t_0$. Following the actual impact, the pressure rises between the time instances $t_0$ and $t_{+1}$ with greater gradient in comparison to the pressure rise caused by the pressure wave. The mechanical impact and the accompanying deformation of parts of the vehicle body between the time instances $t_0$ and $t_{+1}$ impact the sensor signal. From the time instance $t_{+1}$ onwards, a decline of the air pressure signal can be observed.

The control device 6 is configured to detect the pressure wave. Detection is established through analysis of the duration, magnitude, and rate of rise of the air pressure signal produced by the sensors 4, 5. Valid value ranges can be established for these parameters so that a computational evaluation of the air pressure signal can be used to check whether or not a pressure wave is involved immediately before a collision. In this way, the presence of air pressure fluctuations caused by other influences such as changes in speed, side winds or the like can be excluded.

Once the evaluation of the air pressure signal by the control device 6 has established the presence of a pressure wave which would indicate an imminent collision, the control device 6 activates the occupant protection device. Thus, activation of the occupant protection device is implemented between the time instances $t_1$ and $t_0$ and thus before an actual mechanical contact between the accident participants takes place. The airbags 2, 3 are therefore deployed by the control device earlier by a few milliseconds.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A motor vehicle, comprising an occupant protection device provided for a side region of the motor vehicle and including a sensor capable of ascertaining an air pressure signal, and a control device capable of evaluating the air pressure signal and activating the occupant protection device when determining that the air pressure signal indicates the presence of a pressure wave generated before a collision.

2. The motor vehicle of claim 1, wherein the control device is configured to evaluate a parameter of the air pressure signal, said parameter being selected from the group consisting of duration, magnitude, and rate of rise of the air pressure signal.

3. The motor vehicle of claim 1, wherein the control device is configured to activate the occupant protection device before the collision.

4. The motor vehicle of claim 1, wherein the occupant protection device has two of said sensor arranged respectively on both sides of the motor vehicle.

5. The motor vehicle of claim 1, wherein the occupant protection device includes an airbag arranged inside the motor vehicle on the side region of the motor vehicle.

6. The motor vehicle of claim 1, wherein the occupant protection device includes at least two airbags arranged inside the motor vehicle on opposite sides of the motor vehicle.

7. The motor vehicle of claim 1, further comprising a member selected from the group consisting of side sill and B pillar, said sensor being arranged in or behind the member.

8. The motor vehicle of claim 7, wherein the group further includes a covering, said sensor being arranged behind the covering.

9. The motor vehicle of claim 7, wherein the member is configured to allow the sensor to detect a deformation caused by the pressure wave.

10. A method of triggering an occupant protection device of a motor vehicle, comprising:
   ascertaining an air pressure signal by a sensor arranged in a side region of the motor vehicle;
   evaluating the air pressure signal by a control device;
   detecting a pressure wave caused before an impending collision, using the control device, on the basis of the air pressure signal; and
   activating the occupant protection device in response to a detection of the pressure wave.

11. The method of claim 10, wherein the evaluation of the air pressure signal involves an evaluation of a parameter of the air pressure signal, said parameter being selected from the group consisting of duration, magnitude, and increase of the air pressure signal.

\* \* \* \* \*